United States Patent [19]

Joy

[11] 3,719,650
[45] March 6, 1973

[54] HYDROLYZABLE FUNCTIONAL SYLYL ALKYL ALKYL PEROXIDES

[75] Inventor: John Richard Joy, Stevenson, Md.

[73] Assignee: Union Carbide Corporation, New York, N.Y.

[22] Filed: Dec. 8, 1971

[21] Appl. No.: 206,164

Related U.S. Application Data

[62] Division of Ser. No. 82,854, Oct. 21, 1970.

[52] U.S. Cl.............260/89.5 A, 117/124, 260/46.5, 260/89.1, 260/93.5 S, 260/94.9 R, 260/448, 260/2
[51] Int. Cl..............................C08f 3/68, C08f 7/04
[58] Field of Search........260/93.5 S, 89.5 R, 89.5 A, 260/85.5 F

[56] References Cited

UNITED STATES PATENTS 3,297,669   1/1967   Harris et al......................260/85.5 F
2,692,868   10/1954  Berry et al......................260/89.5 A
3,196,136   7/1965   Boutsicaris.....................260/89.5 A
3,300,465   1/1967   Bayer et al.....................260/89.5 A

*Primary Examiner*—Harry Wong, Jr.
*Attorney*—Paul A. Rose et al.

[57] ABSTRACT

Described herein are hydrolyzable functional silyl alkyl alkyl peroxides having the following general formula;

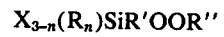

wherein,

X is a hydrolyzable group, R is hydrogen or a monovalent organic radical which is bonded to the silicon atom through a carbon to silicon bond, R' is an alkenylene, cycloalkenylene, alkarylalkylene, or aralkylene, R'' is an alkyl or aralkyl, and $n$ is 0 to 2 inclusive. These hydrolyzable silyl alkyl alkyl peroxides are useful as initiators for the polymerization of monomers having olefinic unsaturation and are also useful in forming silicones.

3 Claims, No Drawings

HYDROLYZABLE FUNCTIONAL SYLYL ALKYL ALKYL PEROXIDES

This is a division, of application Ser. No. 82,854 filed Oct. 2, 1970.

This invention relates to silyl alkyl alkyl peroxides having at least one hydrolyzable functional group, such as alkoxy, aryloxy, halide, amino, acyloxy and the like, bonded directly to the silicon atom thereof. This invention also relates to silicones, having siloxane units which were formed through hydrolysis and condensation of said hydrolyzable functional groups of the silyl alkyl alkyl peroxides.

It is known that it is difficult to initiate the polymerization of monomers having olefinic unsaturation while achieving a polymer having terminal end groups capable of further reaction. The silyl alkyl alkyl peroxides pursuant to this invention will readily thermally free radicalize through the alkyl alkyl peroxy structure to permit such polymerization initiation. Upon such polymerization, the presence of hydrolyzable functionality on the silicon atoms results in a chain terminated polymer having desired hydrolyzable functional end groups which are capable of forming bonds to polar substrates.

Certain acyl peroxides are known in the art and have been used as vulcanizing agents for rubbers and also as polymerization initiators. U.S. Pat. No. 2,963,501 discloses nonhydrolyzable organosilyl peroxides formed by the reaction of the corresponding nonhydrolyzable organosilicon alcohols with peroxides in the presence of sulfuric acid. This strong acid reaction would cause hydrolysis of a hydrolyzable organosilicon alcohol and thus is incapable of providing hydrolyzable functional groups on the silicon atom.

U.S. Pat. No. 2,970,982 discloses different classes of diorganopolysiloxanes having a tertiary alkyl peroxy terminal group which peroxy group is directly bonded to the terminal silicon atom of the polysiloxane chain. These materials are not silyl alkyl alkyl peroxides as described herein.

This invention relates to silyl alkyl alkyl peroxides such as alkyl alkyl peroxy silanes (alkylperoxyalkylsilanes) having the following general formula;

$$X_{3-n}(R_n)SiR'OOR''$$

wherein X is any hydrolyzable functional radical such as alkoxy, aryloxy, halide, amino, acyloxy and the like; each R is one of hydrogen and a monovalent hydrocarbon radical such as alkyl, alkenyl, cycloalkyl, aralkyl, aryl and the like; R' is an alkenylene, cycloalkenylene, alkaryalkylene or aralkylene radical; R'' is an alkyl or aralkyl group; and n is an integer from 0 to 2 inclusive.

This invention also relates to the hydrolyzates and condensates of the afore-described hydrolyzable functional silyl alkyl alkyl peroxides, whereby siloxanes are formed. It is understood in the art, that when n equals 2, the resultant hydrolyzate and condensate is a disiloxane. When n equals 1, the hydrolyzate and condensate is an essentially linear siloxane and when the silane is trifunctional, that is, when n is zero, the resultant hydroylzate and condensate contains siloxane cross-linkage.

The alkyl alkyl peroxy siloxanes pursuant to this invention can have any degree of polymerization and may range from fluids to non-flowing gums to resins wherein they possess the formula:

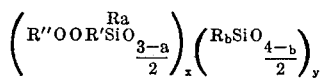

wherein $a$ is 0, 1 or 2; $b$ is 0, 1, 2 or 3; $x$ is a number greater than 1; $y$ is 0 or a number of at least 1; and each R, R' and R'' is one of the radicals defined above therefor. Copolymerization with a broad range of siloxane is possible.

Illustrative of X are any hydrolyzable functional radicals such as halide (such as bromide, chloride and fluoride), alkoxy (such as methoxy, ethoxy, propoxy, dodecyloxy, isopropoxy and the like); aryloxy (such as phenoxy, naphthyloxy, triphenylmethyloxy, and the like); acyloxy (such as acetoxy, proprionoxy, and the like); amino; alkylamino and arylamino (such as methyl amino, diethyl amino, phenyl amino, and the like); hydroxy alkoxy (such as beta-hydroxyethoxy, gamma-hydroxypropoxy, and the like); chloroalkoxy (such as beta-chloroethoxy, beta-chloro-propoxy, and the like); hydroxy; alkoxy alkoxy (such as beta-hydroxyethoxyethoxy, omega-hydroxy-(polyethyleneoxy); ethoxy; omega-hydroxy-(poly-1,2-propyleneoxy), and the like.

Illustrative of R is any monovalent hydrocarbon radical, such as alkyl of from one to 18 carbon atoms (such as methyl, ethyl, n-pentyl, n-dodecyl, n-octadecyl, 2-ethyl-n-hexyl); cycloalkyl (such as cyclobutyl, cyclohexyl, and the like); aryl (such as phenyl, naphthyl, biphenyl, and the like); alkenyl (such as vinyl, allyl, methallyl, 3-butenyl, and the like); alkaryl (such as tolyl, xylyl, 2,4-diethyl-phenyl, 4-dodecylphenyl, and the like); aralkyl (such as phenylethyl); and the like.

Illustrative of R' is a divalent hydrocarbon radical of from one to 18 carbon atoms such as alkenylene (such as vinylene, propenylene, 1-butenylene, 2-butenylene, 2-methyl-propenylene, and the like); cycloalkenylene (such as cyclopropenylene, 2,3-cyclobutenylene and the like); aralkylene (such as phenylethylene, phenylpropylene, 1-(4-methylphenyl) butylene, 3-ethylphenylethylene, naphthylethylene, and the like); alkarylalkylene (such as 1-4-methylenephenylene, 4-(ethylene)cumylene, 1-methyl-3-5-methylene-phenylene, p-cymenylene and the like).

Illustrative R'' is an alkyl group from one to 18 carbon atoms; ethyl, isopropyl, octadecyl, 2,2,4-trimethylpentyl; cycloalkyl groups included are cyclopropyl, cyclobutyl, cyclooctyl, 1-methyl-2-ethylcyclohexyl, and the like; or an aralkyl group of from one to 18 carbon atoms such as ethylbenzyl, cumyl, triphenylmethyl, n-butylbenzyl, beta-phenylethyl, and the like.

The silyl alkyl alkyl peroxides pursuant to this invention can be prepared by the catalytic reaction of an alkyl or aralkyl hydroperoxide with an organosilane containing at least one hydrolyzable functional group and also having a hydrogen capable of abstraction as follows;

$$X_{3-n}(R_n)SiR'H + 2HOOR'' \rightarrow X_{3-n}(R_n)SiR'OOR'' + HOR'' + H_2O$$

wherein the H of the organo silicon compound is bonded to an allylic carbon atom of R' when R' is alkenylene or cycloalkenylene and H is bonded to a benzylic carbon atom when R' is alkarylalkylene or aralkylene; X, R, R', R'' and n are hereinbefore defined.

The catalyst in the above reaction is a metal salt, preferably a copper salt, such as cuprous chloride or copper sulfate and is employed in combination with an organo-amide such as benzamide, acetamide, N-methyl acetamide and the like. Benzamide is the preferred complexing agent when used in conjunction with cuprous chloride.

The above reaction is carried out in the presence of a solvent such as aliphatic hydrocarbons, such as hexane or heptane, cycloaliphatic hydrocarbons such as cyclopentane or cyclohexane, aromatic hydrocarbons, such as benzene, or toluene, and the like.

The operating temperature in the above reaction is not critical, but is advantageously between 25° to 100°C. and the reaction is carried out for periods up to about 25 hours or more, if necessary.

Illustrative of the silanes suitable in the above reaction are; vinyltriethoxysilane, vinyl-tris (2-methoxyethoxysilane, vinyltriacetoxysilane, phenyltrichlorosilane, phenyldimethylmonochlorosilane, phenyltriethoxysilane, phenylmonochloro-diethoxysilane, methylvinyldichlorosilane, naphthyltrimethoxysilane, butylbenzyldichlorosilane, cyclopropenyltriethoxysilane, vinylcumyloxysilane, 4-[2-(triethoxysilyl)ethyl] cyclohexene, 4-[2-(trimethoxysilyl)ethyl] cumene, 4-[2-(dichloro-silyl)ethyl]cumene and the like.

In the above reaction, HOOR'' is an alkyl or aralkyl hydroperoxide.

Illustrative of such hydroperoxides are the following: methyl hydroperoxide; ethyl hydroperoxide; propyl hydroperoxide; isopropyl hydroperoxide; n-butyl hydroperoxide; sec-butyl hydroperoxide, t-butyl hydroperoxide, t-amyl hydroperoxide; 1,1-diethylpropyl hydroperoxide; 1,1,2-trimethylpropyl hydroperoxide; 1-methylhexyl hydroperoxide; 1,1,2,2-tetramethylpropyl hydroperoxide; cyclohexyl hydroperoxide; 4-methylcyclohexyl hydroperoxide.

In the above reaction, HOR'', is an alkyl or aralkyl alcohol which is removed from the product reaction by water dissolution at elevated temperatures, approaching the solution boiling point, as shown in EXAMPLES 1 and 2.

Silyl alkyl alkyl peroxides formed -butenyl(triethoxysilyl)isopropyl the above reaction are for example; triethoxy-silyl propenyl cumyl peroxide, vinyl(triethoxysilyl)propyl peroxide, vinyl(trichlorosilyl) cumyl peroxide, 2-butenyl (triethoxysilyl)isopropyl peroxide, cyclopropenyl(dichlorosilyl) 4-methylcyclohexyl peroxide, phenyl(triethoxysilyl(cumyl peroxide, 4-[2-(trimethoxysilyl)ethyl]cumyl cumyl peroxide, 5-[2-(trimethoxysilyl)ethyl]-3-cyclohexenyl cumyl peroxide, 4-[2-(trimethoxysilyl)ethyl]-3-cyclohexenyl cumyl peroxide, and the like.

The silyl alkyl alkyl peroxides, that is, the alkyl alkyl peroxy silanes of this invention, as stated previously, can be copolymerized with a broad range of siloxanes and cyclic siloxanes. This copolymerization is carried out in the presence of an acid catalyst (for example, sulfuric acid).

The silyl alkyl alkyl peroxides of this invention can be used for any of the purposes for which peroxides are generally employed such as initiators for the polymerization of olefins and as vulcanizing agents for rubbers. For examples the hydrolyzable functional silyl alkyl alkyl peroxides can be used as initiators for the polymerization of monomers having olefinic unsaturation. Illustrative of said operable monomers include the acrylic esters (such as methyl methacrylate); the alkenes, preferably those having omega unsaturation (such as propene and 1-decene); the aryl alkenes (such as styrene, alpha-methylstyrene and the like); the vinyl esters (such as vinyl acetate and the like); the vinyl benzyls; and vinyl biphenylene and the like, and the like. More specifically when a silyl alkyl alkyl peroxide is used as an initiator for the polymerization of styrene, the resulting polymer contains hydrolyzable functional end groups. When the said resulting polymer is heat-cured to a polar substrate, for example glass, a bond is formed which is highly resistant to water immersion.

The following examples are illustrative only and should not be construed in any way so as to limit the invention.

In the following examples, iodometric analyses to measure the active oxygen content of the product silyl alkyl alkyl peroxides, to determine purity, were performed according to the method of C.J. Pederson, as presented in 23 J.Org. Chem., 252(1958) and said analytical procedure is incorporated herein by reference.

EXAMPLE 1

A reaction charge was prepared by mixing 7.6 grams of cumene hydroperoxide (83 percent purity), 26.5 grams of 4-[2-(trimethoxy-silyl)ethyl]cumene(prepared by reacting 4-isopropylstyrene and trimethoxysilane with chloroplatinic acid catalyst), 1.0 grams of benzamide, 0.20 parts of copper (I) chloride and 44 grams of benzene. This charge was heated at 89°C. for 1 ½ hours, during which water formed by the chemical reaction was removed employing a Dean-Stark trap. Ninety-one percent of the cumene hydroperoxide was consumed by the reaction. The charge was then cooled and filtered. The benzene was removed in vacuo of at about 100 mm Hg for 60 minutes at 25°C. About 130 grams of hexane was added to the product mixture and the mixture was filtered through No. 3 paper to remove precipitate benzamide. The hexane was removed in vacuo of at 100 mm Hg for 60 minutes at ambient temperature. Unreacted cumene hydroperoxide and by-product cumyl alcohol were removed by distillation using a water bath at a maximum temperature of 93°C. The residue was centrifuged for 1 hour at 10,000 rpm. in a Servall SS-3 centrifuge having a SS-34 rotor. The product, 4-[2(-trimethoxysilyl)ethyl]cumyl cumyl peroxide, was obtained as 26.1 grams 39.3 percent purity as determined by active oxygen analysis by HI cleavage.

EXAMPLE 2

A reaction was prepared by mixing 7.6 grams of cumene hydroperoxide (83% purity), 23.10 grams of 4-[2-(triethoxysilyl)ethyl]cyclohexene(prepared by reacting 4-vinylcyclohexene and trimethoxysilane with chloroplatinic acid catalyst), 0.100 grams of copper (I) chloride, 0.500 grams of benzamide and 44 grams of benzene. The charge was refluxed 89°C. for 5 hours, during which water formed by the chemical reaction was removed via a Dean-Stark trap. Most of the cumene hydroperoxide (viz. 90.6 percent) was consumed by the reaction. The charge was then cooled and filtered through a No. 3 paper. Benzene was removed in vacuo of 100 mm Hg for 60 minutes at ambient temperature. By-product and unreacted starting material were both removed by vacuum distillation at 0.04 mm Hg, using a water bath as heat source to a maximum temperature of 89°C. The distilled residue was centrifuged for 30 minutes at 10,000 rpm. in a Servall SS-3 centrifuge using a SS-34 rotor. The product, was 8.1 grams 5-[2-(trimethoxysilyl)ethyl]-3-cyclohexenyl cumyl peroxide and the isomer 4-[2-(trimethoxysilyl)ethyl]-3-cyclohexenyl cumyl peroxide. Active oxygen analysis by HL cleavage indicated 54.8 percent purity.

EXAMPLE 3

A test tube was sparged with argon and charged with 10.5 parts of methyl methacrylate (distilled, boiling point of 53°C. at 133 mm Hg) and 0.1 part of 4-[2-(trimethoxysilyl)ethyl]cumyl cumyl peroxide. The tube was heated in an oil bath starting at 100°C. and approaching 250°C. The charge became viscous within 15 minutes (200°C.) and solid after 45 minutes (250°C.).

What is claimed is:

1. In the method for olefin polymerization of at least a monomer having polymerizable olefinic unsaturation, the improvement wherein a hydrolyzable function silyl alkyl alkyl peroxide having the following general formula;

$$X_{3-n}(R_n)SiR'OOR''$$

wherein, X is a hydrolyzable group, R is hydrogen or a monovalent hydrocarbon radical which is bonded to the silicon atom through a carbon to silicon bond, R' is an alkenylene, cycloalkenylene, alkaryl alkylene, or aralkylene, R'' is an alkyl or aralkyl, and $n$ is 0 to 2 inclusive, is used as a polymerization initiator.

2. Claim 1, wherein said monomer is styrene.

3. Claim 1, wherein said monomer is methylmethacrylate.

* * * * *